(12) United States Patent
Maeshima et al.

(10) Patent No.: US 11,651,177 B2
(45) Date of Patent: May 16, 2023

(54) PRINTING APPARATUS WITH CAMERA FOR PHOTOGRAPHING LABEL SURFACE OF DISC

(71) Applicant: SEIKO EPSON CORPORATION, Tokyo (JP)

(72) Inventors: Hidetoshi Maeshima, Shiojiri (JP); Sadaaki Horiuchi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 228 days.

(21) Appl. No.: 16/871,200

(22) Filed: May 11, 2020

(65) Prior Publication Data

US 2020/0364522 A1 Nov. 19, 2020

(30) Foreign Application Priority Data

May 13, 2019 (JP) .............................. JP2019-090372

(51) Int. Cl.
*H04N 1/21* (2006.01)
*G06K 15/10* (2006.01)
*G06K 15/02* (2006.01)
*H04N 7/18* (2006.01)
*H04N 5/225* (2006.01)
*G11B 7/00* (2006.01)

(52) U.S. Cl.
CPC ......... *G06K 15/102* (2013.01); *G06K 15/024* (2013.01); *H04N 5/2253* (2013.01); *H04N 7/18* (2013.01); *G11B 2007/0016* (2013.01)

(58) Field of Classification Search
None
See application file for complete search history.

(56) References Cited

U.S. PATENT DOCUMENTS

| | | | | |
|---|---|---|---|---|
| 6,141,298 | A * | 10/2000 | Miller | G11B 17/08 34/178 |
| 6,327,230 | B1 * | 12/2001 | Miller | G07F 17/26 700/235 |
| 2003/0222928 | A1 * | 12/2003 | Cummins | G11B 23/40 |
| 2007/0109601 | A1 * | 5/2007 | Mitani | B41J 3/44 358/1.18 |
| 2009/0262609 | A1 * | 10/2009 | Ebina | G11B 17/10 |
| 2012/0033537 | A1 * | 2/2012 | Hassler | B41J 3/4071 369/84 |

FOREIGN PATENT DOCUMENTS

JP 2010-170629 A 8/2010

* cited by examiner

*Primary Examiner* — Dung D Tran
(74) *Attorney, Agent, or Firm* — Workman Nydegger

(57) ABSTRACT

A printing apparatus comprising: a disc receiving portion configured to receive a disc which can record data; and a camera provided to oppose to a label surface of the disc when the disc is received in the disc receiving portion and configured to photograph the label surface of the disc.

4 Claims, 9 Drawing Sheets

PRINTING APPARATUS WITH CAMERA FOR PHOTOGRAPHING LABEL SURFACE OF DISC

The present application is based on, and claims priority from JP Application Serial Number 2019-090372, filed on May 13, 2019, the disclosure of which is hereby incorporated by reference herein in its entirety.

BACKGROUND

1. Technical Field

The present disclosure relates to a printing apparatus.

2. Related Art

As a related art, an apparatus for processing a disc configured to record data, such as a compact disc (CD), a digital versatile disc (DVD), or a Blu-ray (registered trademark) disc (BD) is known. For example, JP-A-2010-170629 discloses a publisher writing data to a recording surface of a disc and printing an image on a label surface of the disc.

In the disc processing apparatus disclosed in JP-A-2010-170629, there is no disclosure about photographing the label surface of the disc. The disc processing apparatus according to the related art cannot photograph the label surface of the disc.

SUMMARY

According to an aspect of the present disclosure, a printing apparatus includes a disc receiving portion configured to receive a disc which can record data and a camera provided to oppose to a label surface of the disc when the disc is received in the disc receiving portion and configured to photograph the label surface of the disc.

The printing apparatus may further include: a transport arm configured to include a disc-gripping portion gripping the disc received in the disc receiving portion, and configured to transport the disc, in which the camera may be provided at the transport arm.

The printing apparatus may further include: a transport arm configured to include a disc-gripping portion gripping the disc received in the disc receiving portion, and configured to transport the disc, and a data recording device configured to read and write data from and to the disc, in which the data recording device may include, as the disc receiving portion, a first tray configured to move between a first position where the disc is mounted by the transport arm and a second position where reading and writing of data from and to the disc are performed, and the camera may oppose to the label surface of the disc mounted in the first tray at the first position.

The printing apparatus may further include: a transport arm configured to include a disc-gripping portion gripping the disc received in the disc receiving portion, and configured to transport the disc, and a printing portion configured to perform printing on the label surface of the disc, in which the printing portion may include, as the disc receiving portion, a second tray configured to move between a third position where the disc is mounted by the transport arm and a fourth position where printing is performed on the label surface of the disc, and the camera may oppose to the label surface of the disc mounted in the second tray at the third position.

In the printing apparatus, the disc receiving portion may be configured to receive discs before processing or discs after processing in a stacked state, and the camera may oppose to the label surface of the disc received in the disc receiving portion.

DESCRIPTION OF EXEMPLARY EMBODIMENTS

1. First Embodiment

A first embodiment will be described.

Figure 1:
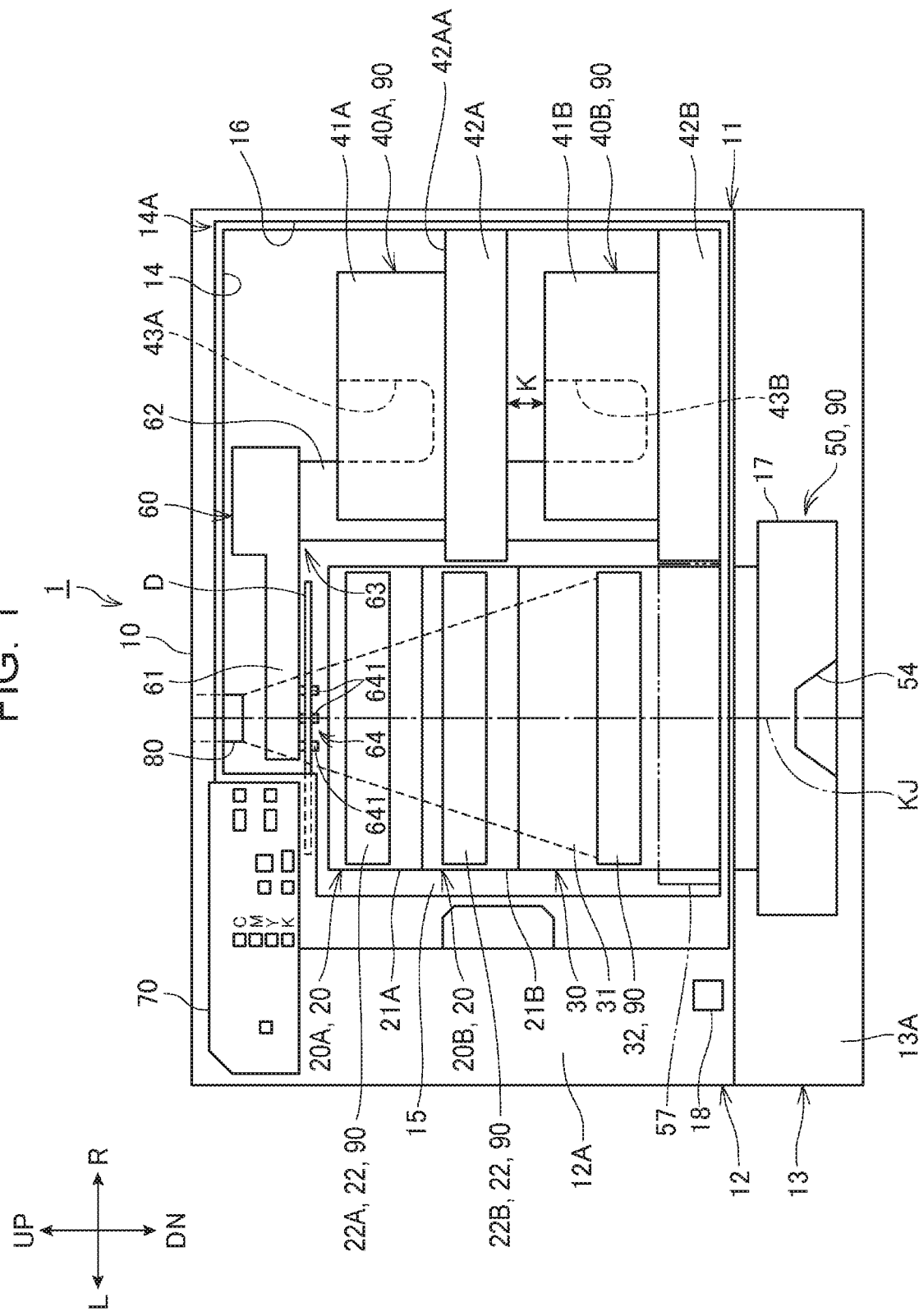
FIG. 1 is a front view illustrating a configuration of a publisher according to a first embodiment.
Figure 2:
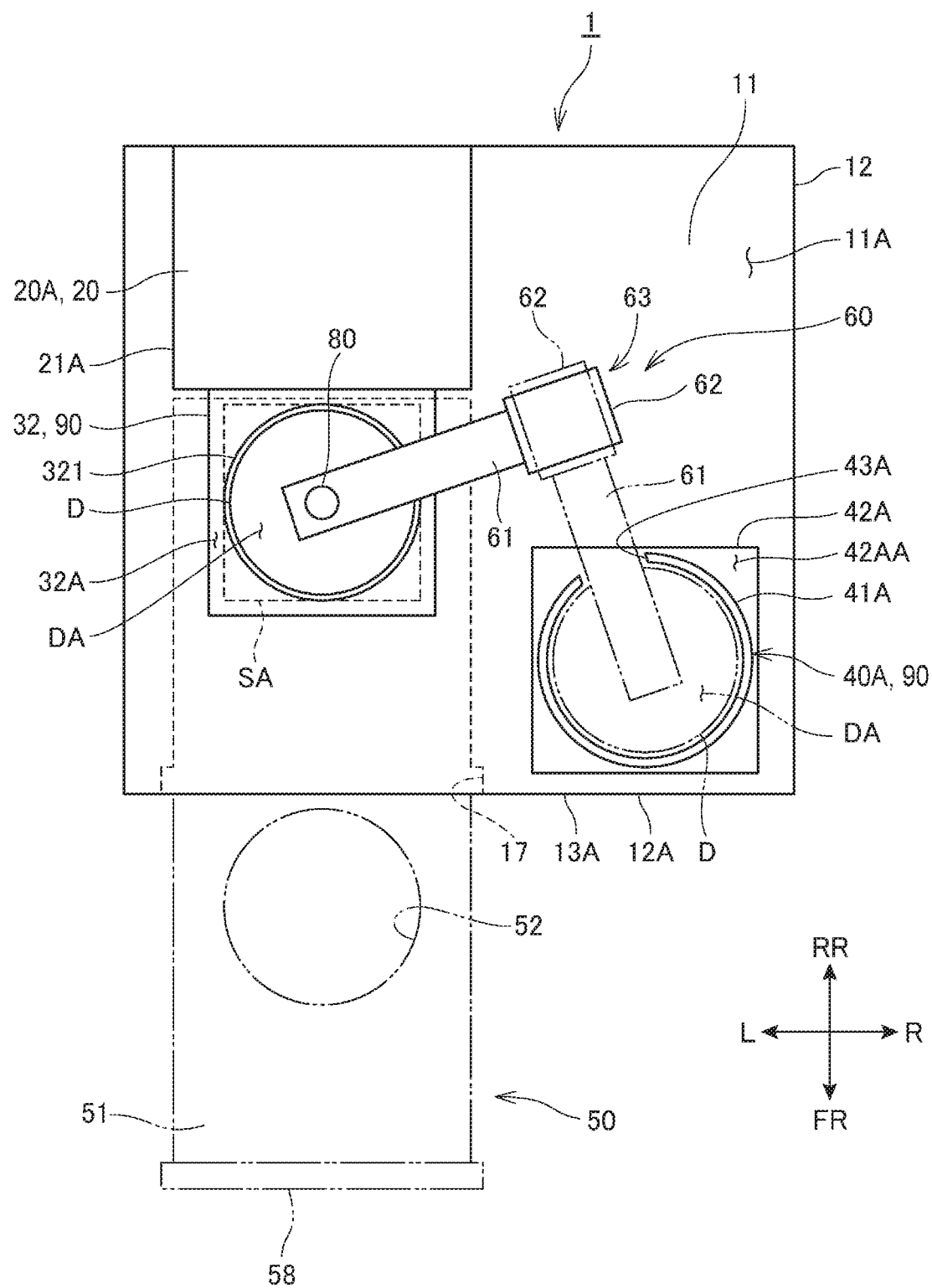
FIG. 2 is a top plan view of the interior of a housing of the publisher.

FIG. 1 is a front view illustrating a configuration of a publisher 1 according to a first embodiment. FIG. 2 is a top plan view of the interior of a housing 10 of the publisher 1. The publisher 1 is an example of a recording medium processing apparatus and a printing apparatus.

Here, reference symbol FR denotes the front side of the publisher 1 in an installed state. Reference symbol RR denotes the rear side of the publisher 1. Further, reference symbol R denotes the right side of the publisher 1, reference symbol L denotes the left side of the publisher 1, reference symbol UP denotes the upper side of the publisher 1, and reference symbol DN denotes the lower side of the publisher 1. These directions are common to FIGS. 1, 2, 5, 6, 7, and 8.

The publisher 1 is an apparatus that performs processing such as writing of data to a circular disc D such as a CD, a DVD, or a BD, reading of data from the disc D, or printing of an image on a label surface DA of the disc D.

As illustrated in FIG. 1, the interior of the housing 10 of the publisher 1 is vertically partitioned by a partitioning portion 11. In the following description, a portion above the partitioning portion 11 of the housing 10 is referred to as an "upper portion of the housing" and is denoted by reference numeral "12", and a portion below the partitioning portion 11 of the housing 10 is referred to as a "lower portion of the housing" and is denoted by reference numeral 13.

In the upper portion 12 of the housing, a first disc drive 20A, a second disc drive 20B, a label printer 30, a first stacker 40A, a second stacker 40B, a transport portion 60, and a camera 80 are provided.

The first disc drive 20A and the second disc drive 20B are examples of a data recording device. In the following description, when the first disc drive 20A and the second disc drive 20B need not be distinguished from each other, the first disc drive 20A and the second disc drive 20B are collectively referred to as a "disc drive" and denoted by reference numeral "20". The label printer 30 is an example of a printing portion.

The first disc drive 20A is a device for performing writing and reading of data by irradiating a recording surface of the disc D with laser light. The first disc drive 20A includes a first disc drive body 21A and a first drive tray 22A that can be pulled forward out of the first disc drive body 21A. A substantially circular recess portion in which the disc D is to be mounted is formed in an upper surface of the first drive tray 22A. The first drive tray 22A is configured to be movable between a first drive processing position where writing and reading of data to and from the disc D are performed and a first drive transfer position where the disc D is transferred by a transport arm 61 of the transport portion 60 in the first disc drive body 21A in a front-rear direction.

The second disc drive 20B is a device performing writing and reading of data by irradiating the recording surface of the disc D with laser light. The second disc drive 20B includes a second disc drive body 21B and a second drive tray 22B that can be pulled forward out of the second disc drive body 21B. A substantially circular recess portion in which the disc D is to be mounted is formed in an upper surface of the second drive tray 22B, similarly to the first drive tray 22A. The second drive tray 22B is configured to be movable between a second drive processing position where writing and reading of data to and from the disc D are performed and a second drive transfer position where the disc D is transferred by the transport arm 61 of the transport portion 60 in the second disc drive body 21B in the front-rear direction. Note that the second drive transfer position is below the first drive transfer position in a vertical direction.

In the following description, when the first drive tray 22A and the second drive tray 22B need not be distinguished from each other, the first drive tray 22A and the second drive tray 22B are collectively referred to as a "drive tray" and denoted by reference numeral "22". The drive tray 22 is an example of a first tray.

Further, in the following description, when the first drive processing position and the second drive processing position need not be distinguished from each other, the first drive processing position and the second drive processing position are collectively referred to as a "drive processing position". The drive processing position is an example of a second position.

Further, in the following description, when the first drive transfer position and the second drive transfer position need not be distinguished from each other, the first drive transfer position and the second drive transfer position are collectively referred to as a "drive transfer position". The drive transfer position is an example of a first position.

The label printer 30 is a printing mechanism that includes a carriage 301 for performing scanning in a left-right direction, an ink jet head 302 mounted in the carriage 301, and the like and that prints an image on the label surface DA of the disc D. The label printer 30 includes a printer body 31 and a printer tray 32 that can be pulled forward out of the printer body 31. The printer tray 32 is an example of a second tray. A substantially circular recess portion 321 in which the disc D is to be mounted is formed in the printer tray 32, similarly to the drive tray 22. The printer tray 32 is configured to be movable, in the front-rear direction, between a printer processing position where printing of an image on the label surface DA of the disc D is performed and a printer transfer position where the disc D is transferred by the transport arm 61 of the transport portion 60, in the printer body 31. The printer processing position is an example of a fourth position, and the printer transfer position is an example of a third position. Note that FIG. 2 illustrates a state where the printer tray 32 is positioned in the printer transfer position and the disc D is being mounted by the transport arm 61. Further, FIG. 2 illustrates a case where the drive tray 22 is positioned in the drive processing position.

In the following description, when the drive tray 22, the printer tray 32, the first stacker 40A, the second stacker 40B, and a third stacker 50 need not be distinguished from each other, the drive tray 22, the printer tray 32, the first stacker 40A, the second stacker 40B, and the third stacker 50 are collectively referred to as a "disc receiving section" and denoted by reference numeral "90".

The first disc drive 20A, the second disc drive 20B, and the label printer 30 are arranged inline in the top-bottom direction toward the rear-left side of a guide 62, described later, in the upper portion 12 of the housing. Specifically, the first disc drive 20A, the second disc drive 20B, and the label printer 30 are arranged in the top-bottom direction in the upper portion 12 of the housing so that a central axis of the disc D mounted in the first drive tray 22A positioned in the first drive transfer position, a central axis of the disc D mounted in the second drive tray 22B positioned in the second drive transfer position, and a central axis of the disc D mounted in the printer tray 32 positioned in the printer transfer position coincide with one another.

As illustrated in FIG. 1, the camera 80 is provided in the upper portion 12 of the housing at a position above the transport arm 61, the disc drive 20, the label printer 30, and the third stacker 50 as described later to photograph an area below the camera 80. For example, the camera 80 is provided on an underside (not illustrated) of the upper portion 12 of the housing. The camera 80 is provided so that an optical axis KJ coincides with a central axis of the disc D mounted in the drive tray 22 positioned in the drive transfer position, a central axis of the disc D mounted in the printer tray 32 positioned in the printer transfer position, and a central axis of the disc D received in the third stacker 50. In the publisher 1, the disc D is transported by the transport arm 61, in a state where the label surface DA faces upward. That is, the camera 80 is provided in the upper portion 12 of the housing of the publisher 1 and faces (opposes to) the label surface DA of the disc D received in the drive tray 22, the printer tray 32, and the third stacker 50.

Note that, in FIGS. 1 and 2, the camera 80 focuses on a mounting surface 32A of the printer tray 32 positioned in the printer transfer position. Further, a photographing range SA of the camera 80 is a range within the mounting surface 32A of the printer tray 32 when viewed from above and is set to include at least the mounted disc D. Note that when the camera 80 photographs the label surface of the disc D mounted in the drive tray 22, the camera 80 focuses on a mounting surface of the drive tray 22 positioned in the drive transfer position. Further, in the case, the photographing range SA of the camera 80 is a range within the mounting surface of the drive tray 22 when viewed from above and is set to include at least the mounted disc D.

As illustrated in FIG. 1, the first stacker 40A and the second stacker 40B are provided in the upper portion 12 of the housing.

The first stacker 40A includes a cylindrical first stacker receiving portion 41A that can receive, for example, tens of discs D in a stacked state, and either a disc D before being processed by the publisher 1 or a disc D after being processed by the publisher 1 can be received. The first stacker receiving portion 41A is detachably supported in the housing 10 by a first stacker base 42A fixed to the housing 10. An elongated cut portion 43A is formed in a part of an outer wall of the first stacker receiving portion 41A by cutting the part of the outer wall downward. Due to the cut portion 43A, the transport arm 61 of the transport portion 60 can move up to a lower portion of the first stacker receiving portion 41A.

The second stacker 40B includes a cylindrical second stacker receiving portion 41B that can receive, for example, tens of discs D in a stacked state, and either a disc D before being processed by the publisher 1 or a disc D after being processed by the publisher 1 can be received. The second stacker receiving portion 41B is detachably supported in the housing 10 by a second stacker base 42B fixed to the housing 10. Further, the second stacker receiving portion 41B is detachably supported by the second stacker base 42B below the first stacker 40A while having a gap K, into which the transport arm 61 of the transport portion 60 can be inserted, between an upper end of the second stacker receiving portion 41B and a lower surface of the first stacker base 42A. An elongated cut portion 43B is formed in a part of an outer wall of the second stacker receiving portion 41B by cutting the part of the outer wall downward. Due to the cut portion 43B, the transport arm 61 of the transport portion 60 can move up to a lower portion of the second stacker receiving portion 41B.

As illustrated in FIGS. 1 and 2, the first stacker 40A and the second stacker 40B are arranged inline in the top-bottom direction toward the front-right side of the guide 62 as described later in the upper portion 12 of the housing. Specifically, the first stacker 40A and the second stacker 40B are provided in the upper portion 12 of the housing so that central axes of the received discs D coincide with each other.

As illustrated in FIGS. 1 and 2, the transport portion 60 transporting the disc D between the first stacker 40A, the second stacker 40B, the third stacker 50, the first disc drive 20A, the second disc drive 20B, and the label printer 30 is provided in the upper portion 12 of the housing.

The transport portion 60 includes the elongated transport arm 61 and the guide 62 supporting the transport arm 61. The guide 62 is positioned behind the first stacker 40A and the second stacker 40B and is provided to the right of the first disc drive 20A, the second disc drive 20B, and the label printer 30. The guide 62 is formed in an elongated rod shape and is erected on an upper surface 11A of the partitioning portion 11. One end portion of the transport arm 61 in a longitudinal direction moves in the longitudinal direction of the guide 62 and is supported by the guide 62 via an arm-driving portion 63 rotating around an axis of the guide 62. Therefore, as the arm-driving portion 63 is driven, the transport arm 61 can move vertically and rotate around the axis of the guide 62. Further, a disc-gripping portion 64 releasably gripping the disc D is provided on a lower portion of the transport arm 61 at an end portion that is opposite to the end portion supported by the guide 62 in the longitudinal direction of the transport arm 61.

The disc-gripping portion 64 includes three columnar gripping members 641 that grip the disc D by abutting a side surface of a central hole of the disc D. The three gripping members 641 protrude downward from the transport arm 61. The three gripping members 641 are provided in the same circle at equal angle intervals on a lower end portion of the transport arm 61. The three gripping members 641 can move radially in conjunction with one another. The three gripping members 641 move outward in the radial direction in a state of being inserted into the central hole of the disc D to abut the side surface of the central hole, thereby gripping the disc D. Further, the three gripping members 641 move inward in the radial direction in a state of gripping the disc D, thereby releasing the disc D.

As illustrated in FIGS. 1 and 2, in the upper portion 12 of the housing, a space for the transport portion 60 to transport the disc D vertically is formed to the left of the first stacker 40A and the second stacker 40B and in front of the first disc drive 20A, the second disc drive 20B, and the label printer 30. Further, the third stacker 50 is provided below the space.

Further, as illustrated in FIG. 1, an opening portion 14 is formed in a front surface 12A of the upper portion 12 of the housing. A door 15 rotatably supported by a door shaft 16 provided at a right end portion 14A of the opening portion 14 is provided on a front side of the opening portion 14. In the publisher 1, the first disc drive 20A, the second disc drive 20B, the label printer 30, and the transport portion 60 can be operated when it is detected that the door 15 is in a closed state with respect to the opening portion 14. Note that, in the publisher 1, the operations of the first disc drive 20A, the second disc drive 20B, the label printer 30, and the transport portion 60 stop when it is detected that the door 15 is in an open state with respect to the opening portion 14.

A power supply switch 18 for switching on or switching off a power supply of the publisher 1 is provided on the lower-left side of the front surface 12A of the upper portion 12 of the housing when viewed from the front in FIG. 1. Further, a notification portion 70 notifying a user of various states of the publisher 1 is provided on the upper-left side of the front surface 12A of the upper portion 12 of the housing when viewed from the front in FIG. 1.

The notification portion 70 includes, for example, a light emitting diode (LED) corresponding to a notification device, and a lighting state of the LED is changed to notify the user of various states. For example, the notification portion 70 notifies the user of a switched-on state or a switched-off state of the power supply of the publisher 1. In addition, for example, the notification portion 70 notifies the user of the amount of remaining ink of each color in the label printer 30.

As illustrated in FIG. 1, the third stacker 50 is provided in the lower portion 13 of the housing while being arranged together with the first disc drive 20A, the second disc drive 20B, and the label printer 30. The third stacker 50 includes a third stacker receiving portion 51 that can be pulled forward out of the housing 10 through a disc port 17 formed in a front surface 13A of the lower portion 13 of the housing. The third stacker receiving portion 51 has a substantially circular recess portion 52 in which the discs D are to be stacked and received, and several discs D can be received in the recess portion 52. The third stacker receiving portion 51 can be pulled out through the disc port 17 to insert or remove the disc D even when the door 15 is closed. In other words, a user can pull the third stacker receiving portion 51 out through the disc port 17 to insert or remove the disc D in or from the third stacker receiving portion 51 even when the first disc drive 20A, the second disc drive 20B, the label printer 30, and the transport portion 60 are in operation. Therefore, as illustrated in FIG. 1, a gripping portion 54 that can be gripped by the user when pulling the third stacker receiving portion 51 forward out of the housing 10 is formed in a front surface 53 of the third stacker 50.

As indicated by a two-dot chain line in FIG. 1, an additional stacker 57 can be attached to the third stacker 50. The additional stacker 57, in which the discs D can be loaded and received, is formed in a cylindrical shape with a bottom. As the additional stacker 57 is attached to the third stacker 50, the number of discs D that can be received in the third stacker 50 can be increased by several to tens.

Figure 3:
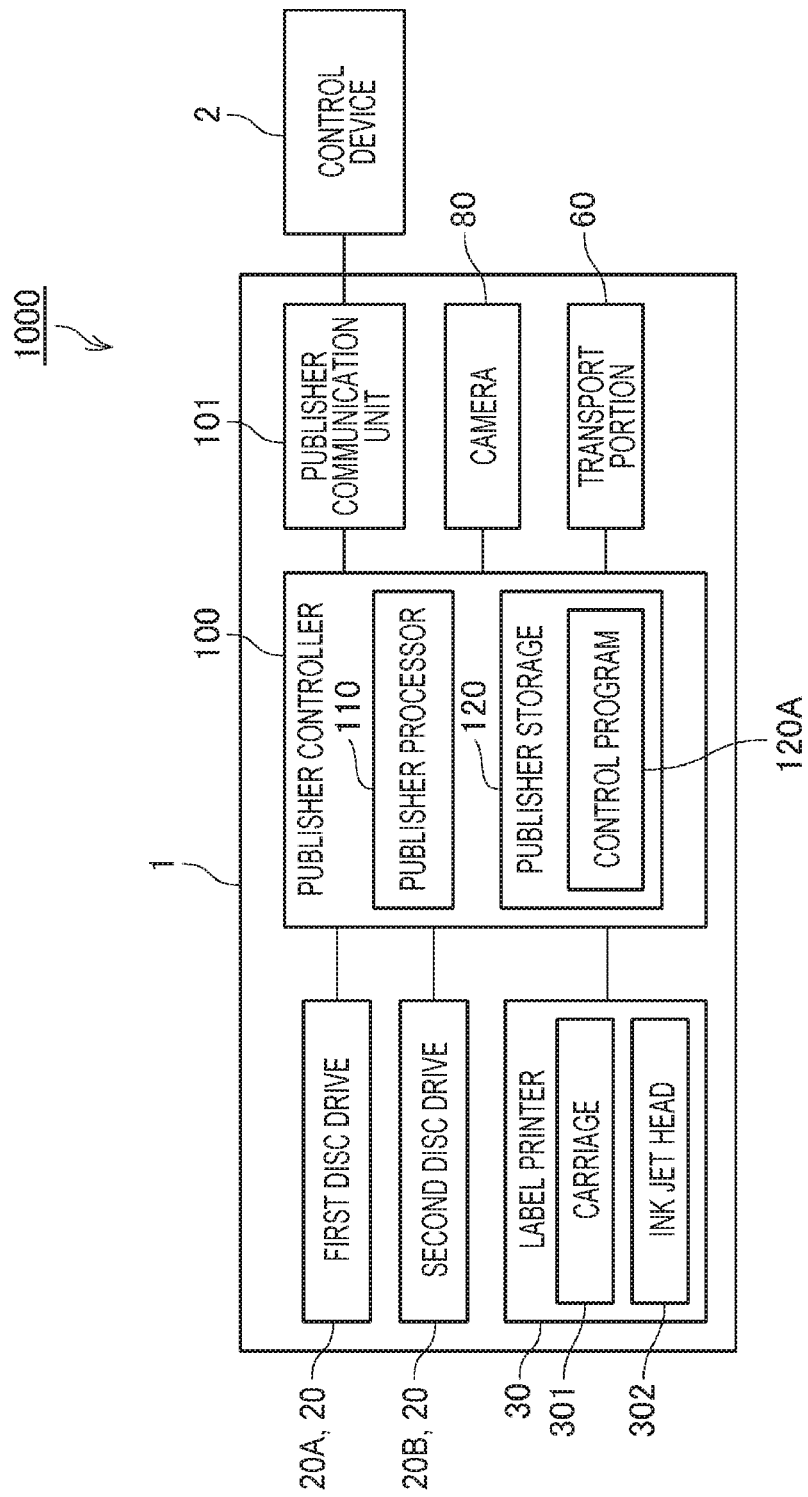
FIG. 3 is a block diagram illustrating a configuration of the publisher.

FIG. 3 is a block diagram illustrating a configuration of the publisher 1.

As illustrated in FIG. 3, the publisher 1 constitutes a disc processing system 1000, together with a control device 2. In the disc processing system 1000 according to the present embodiment, the publisher 1 or the publisher 1 and the control device 2 perform processing such as writing of data to the recording surface of the disc D, reading of data from the disc D, and printing of an image on the label surface DA of the disc D. Note that the control device 2 is an apparatus controlling the publisher 1.

The publisher 1 includes a publisher controller 100, a publisher communication unit 101, the first disc drive 20A, the second disc drive 20B, the label printer 30, and the transport portion 60.

The publisher controller 100 includes a publisher processor 110, which is a processor for executing a program, such as a central processing unit (CPU) or a microprocessing unit (MPU), and publisher storage 120 and controls each component of the publisher 1. The publisher controller 100 performs various processing operations by using a combination of hardware and software so that the publisher processor 110 reads a control program 120A stored in the publisher storage 120 and performs processing.

The publisher storage 120 includes a storage region in which a program to be executed by the publisher processor 110 or data to be processed by the publisher processor 110 are stored. The publisher storage 120 stores the control program 120A to be executed by the publisher processor 110 or other various data. The publisher storage 120 includes a non-volatile storage region in which a program or data are stored in a non-volatile manner. Further, the publisher storage 120 may include a volatile storage region to provide a work area in which a program to be executed by the publisher processor 110 or data to be processed are temporarily stored.

The publisher communication unit 101 is implemented by communication hardware according to a predetermined communication standard and performs communication with the control device 2 in accordance with control of the publisher controller 100. Note that examples of the communication hardware can include hardware such as a communication circuit, a communication port, a communication substrate, and a communication connector. The communication standard used between the publisher communication unit 101 and the control device 2 may be a wired communication standard or a wireless communication standard. In the present embodiment, a universal serial bus (USB) standard is used as an example.

The first disc drive 20A and the second disc drive 20B read data from the disc D or write data to the recording surface of the disc D in accordance with the control of the publisher controller 100.

The label printer 30 receives ink from an ink supply port (not illustrated) and prints an image on the label surface DA of the disc D in accordance with the control of the publisher controller 100.

The transport portion 60 includes the transport arm 61, the guide 62, the arm-driving portion 63, the disc-gripping portion 64, a driving portion driving the disc-gripping portion 64, and other components related to the transportation of the disc D and transports the disc D in accordance with the control of the publisher controller 100. The disc D according to the present embodiment is transported by the transport portion 60 in a state where the label surface DA faces upward.

The camera 80 photographs the label surface DA of the disc D mounted in the printer tray 32 positioned in the printer transfer position in accordance with the control of the publisher controller 100 and outputs photographed image data indicating a photographed image to the publisher controller 100.

Figure 4:
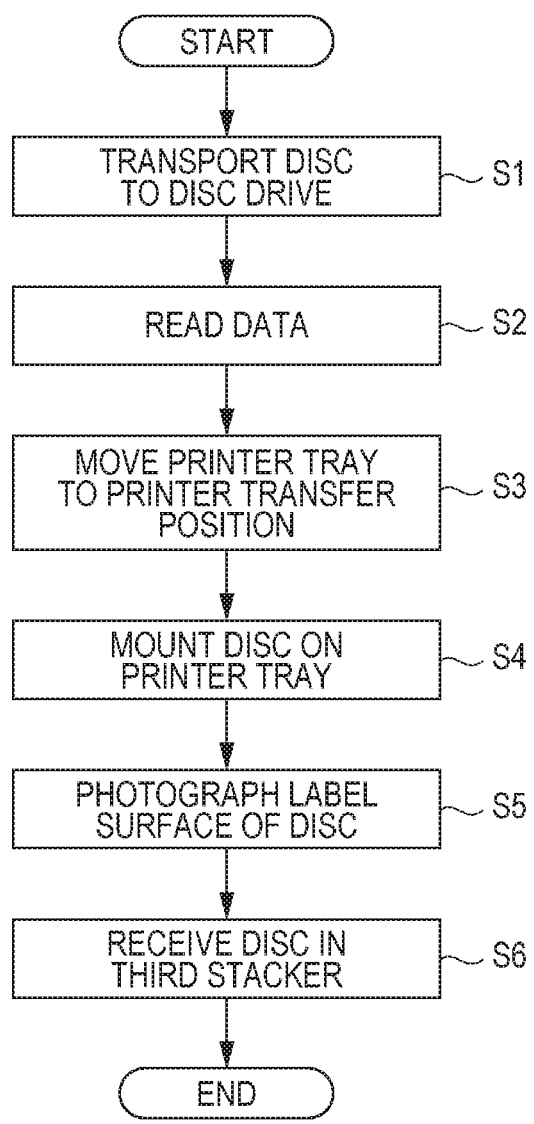
FIG. 4 is a flowchart illustrating operation of the publisher.

Next, an operation of the publisher 1 when photographing the label surface DA of the disc D will be described. FIG. 4 is a flowchart illustrating an operation of the publisher 1.

The operation of the publisher 1 illustrated in FIG. 4 is an operation of the publisher 1 when photographing a label surface DA of one disc D. Further, in the operation of the publisher 1 illustrated in FIG. 4, an operation of reading data from the recording surface of the disc D is also performed. In addition, the operation of the publisher 1 illustrated in FIG. 4 is a transport aspect in which the disc D to be photographed is received in the first stacker 40A and the disc D received in the first stacker 40A is transported to the third stacker 50 by the transport portion 60. Further, in the operation of the publisher 1 illustrated in FIG. 4, the camera 80 focuses on the mounting surface 32A of the printer tray 32 positioned in the printer transfer position, and the camera 80 photographs the label surface of the disc D mounted in the printer tray 32 positioned in the printer transfer position.

The publisher controller 100 controls the transport portion 60 to transport one disc D from the first stacker 40A to the first disc drive 20A or the second disc drive 20B (Step S1).

Then, the publisher controller 100 controls the first disc drive 20A or the second disc drive 20B to receive the disc D transported by the transport portion 60 in the drive tray 22 and read data from a recording surface of the disc D (Step S2).

Then, the publisher controller 100 controls the label printer 30 to move the printer tray 32 to the printer transfer position (Step S3). Note that the publisher controller 100 may also move the printer tray 32 to the printer transfer position after the reading of the data from the disc D is completed.

Then, once the reading of the data from the disc D is completed, the publisher controller 100 controls the transport portion 60 to take out the disc D from the drive tray 22, transport the disc that is taken out, and mount the disc D on the printer tray 32 positioned in the printer transfer position (Step S4).

Then, the publisher controller 100 controls the camera 80 to photograph a label surface DA of the disc D mounted in the printer tray 32 (Step S5). In Step S5, the photographing with the camera 80 is performed in a state where the transport arm 61 retreats to a specific position to prevent the transport arm 61 from entering into the photographing range SA of the camera 80. This is because the camera 80 is positioned above the transport arm 61. Note that, the specific position is determined in advance. Photographed image data indicating a photographed image obtained by the photographing with the camera 80 are stored in a predetermined storage region of the publisher storage 120 or the control device 2.

Then, the publisher controller 100 controls the transport portion 60 to take out the disc D from the printer tray 32, transport the disc D to the third stacker 50, and receive the disc D in the third stacker 50 (Step S6). Note that the publisher controller 100 may control the printer tray 32 to be positioned in the printer processing position when the transport portion 60 transports the disc D to the third stacker 50 to prevent the transport portion 60 and the printer tray 32 from contacting each other.

Note that, although the operation of the publisher 1 described with reference to FIG. 4 is the operation of transporting the disc D from the first stacker 40A to the third stacker 50, the operation of the publisher 1 may be an operation of transporting the disc D from the second stacker 40B to the third stacker 50, an operation of transporting the disc D from the first stacker 40A to the second stacker 40B, or an operation of transporting the disc D from the second stacker 40B to the first stacker 40A.

2. Second Embodiment

Next, a second embodiment will be described.

Figure 5:
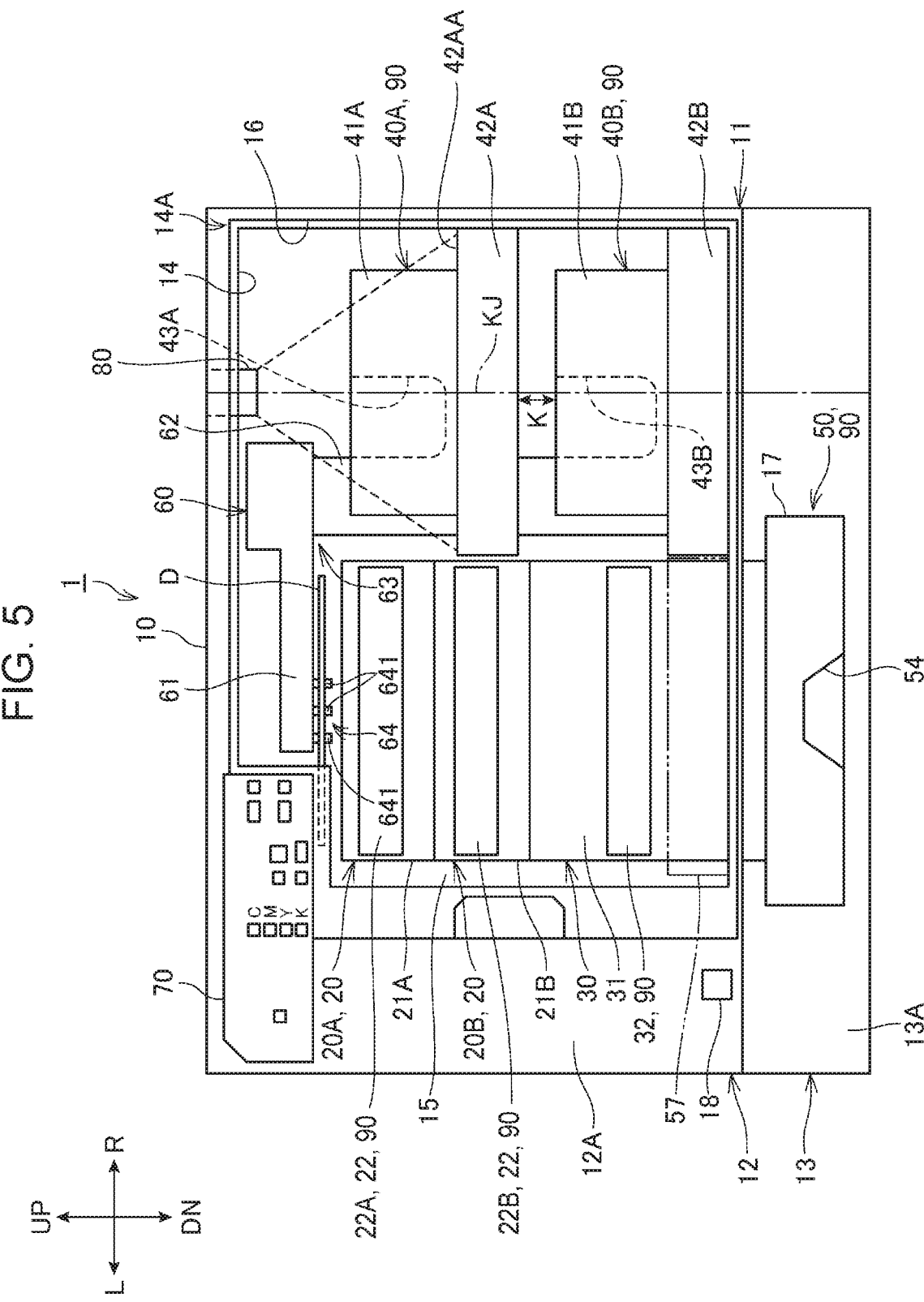
FIG. 5 is a front view illustrating a configuration of a publisher according to a second embodiment.
Figure 6:
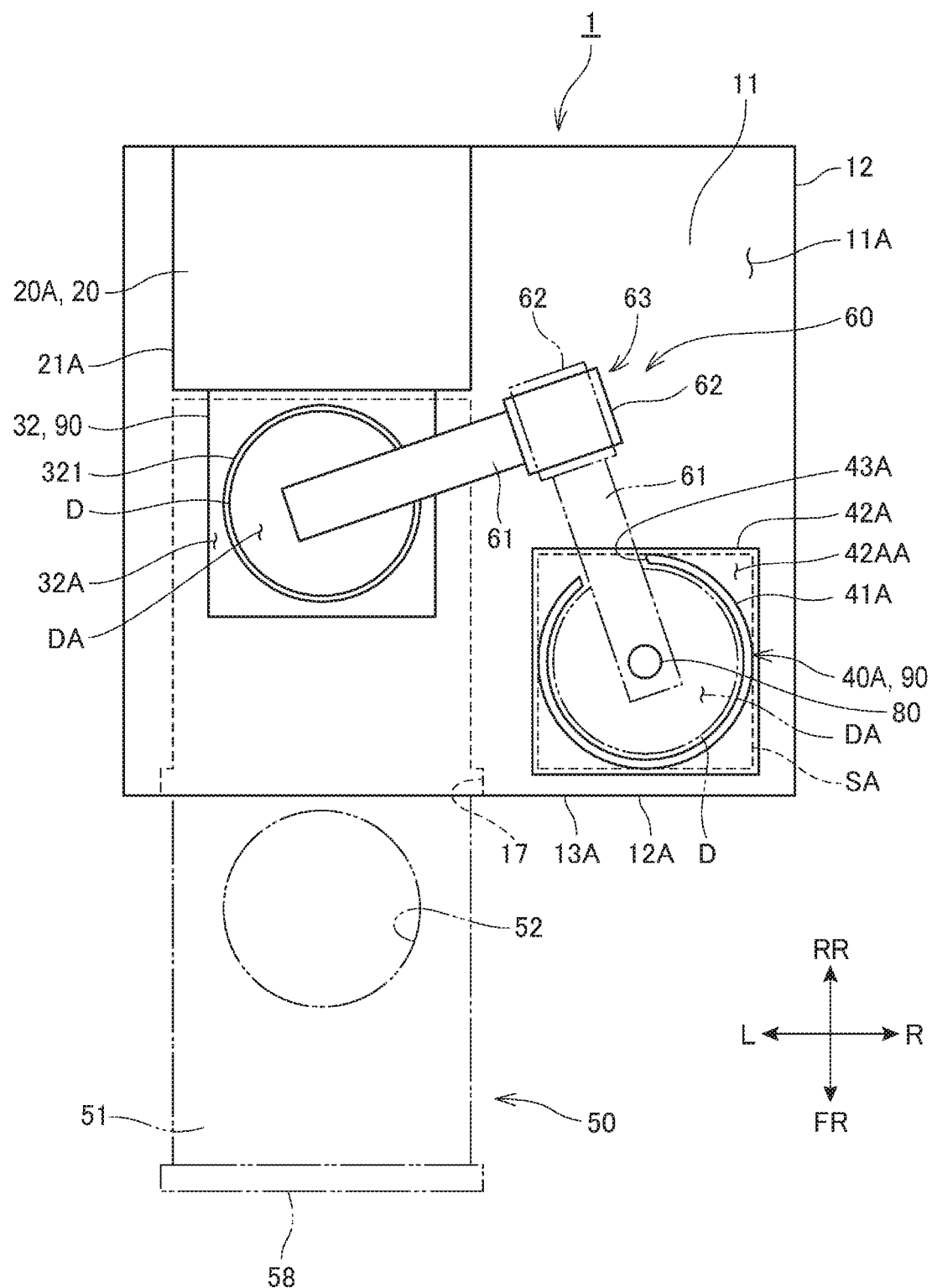
FIG. 6 is a top plan view of the interior of a housing of the publisher.

FIG. 5 is a front view illustrating a configuration of a publisher 1 according to the second embodiment. FIG. 6 is a top plan view of the interior of a housing 10 of the publisher 1 according to the second embodiment. In the following description, the same components as those of the publisher 1 according to the first embodiment will be denoted by the same reference numerals, and a detailed description thereof will be omitted.

As can be appreciated from comparison between FIGS. 1 and 5, and comparison between FIGS. 2 and 6, in the publisher 1 according to the second embodiment, a camera 80 photographing an area below the camera 80 is provided above a first stacker 40A in an upper portion 12 of a housing. For example, the camera 80 is provided on a ceiling (not illustrated) of the upper portion 12 of the housing. The camera 80 is provided so that an optical axis KJ coincides with a central axis of a disc D received in the first stacker 40A. In the publisher 1, since the disc D is transported by a transport arm 61 in a state where a label surface DA faces upward, the disc D is received in the first stacker 40A in a state where the label surface DA faces upward. That is, the camera 80 is provided facing the label surface DA of the disc D received in the first stacker 40A in a housing 10 of the publisher 1.

Note that, in the publisher 1 illustrated in FIGS. 5 and 6, the camera 80 is focused on a label surface DA of the uppermost disc D of one or more discs D stacked and received in the first stacker 40A according to a predetermined method. Here, the focus of the camera 80 may be fixed or automatically adjusted each time the disc D is processed by the publisher 1 one by one. Further, in the publisher 1 illustrated in FIGS. 5 and 6, a photographing range SA of the camera 80 is a range within a support surface 42AA of a first stacker base 42A when viewed from above, and is set to include at least the mounted disc D. According to the second embodiment, the transport arm 61 retreats to a specific position to prevent the transport arm 61 from entering the photographing range SA when performing the photographing with the camera 80, similarly to the first embodiment. This is because the camera 80 is positioned above the transport arm 61.

3. Third Embodiment

Next, a third embodiment will be described.

Figure 7:
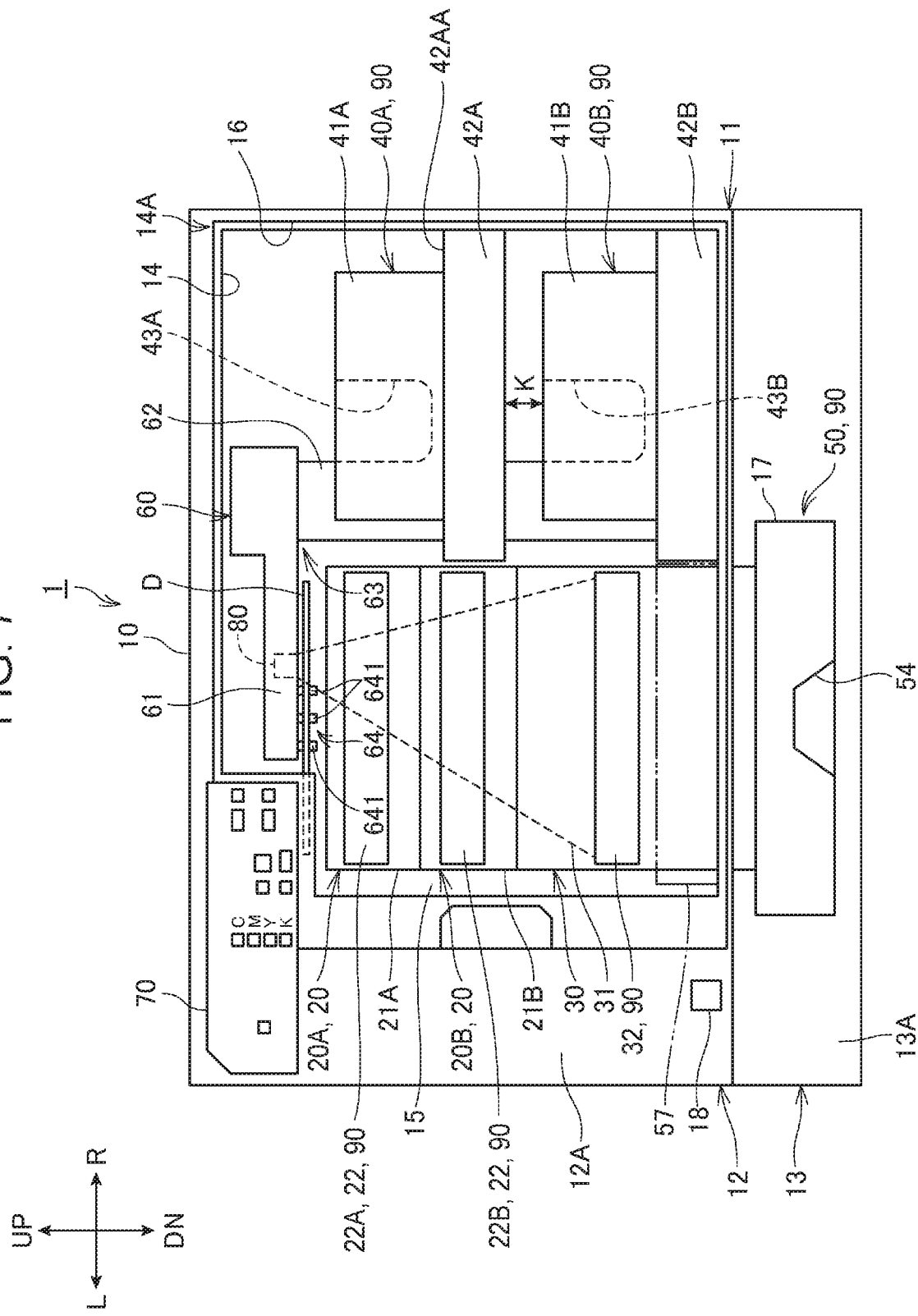
FIG. 7 is a front view illustrating a configuration of a publisher according to a third embodiment.
Figure 8:
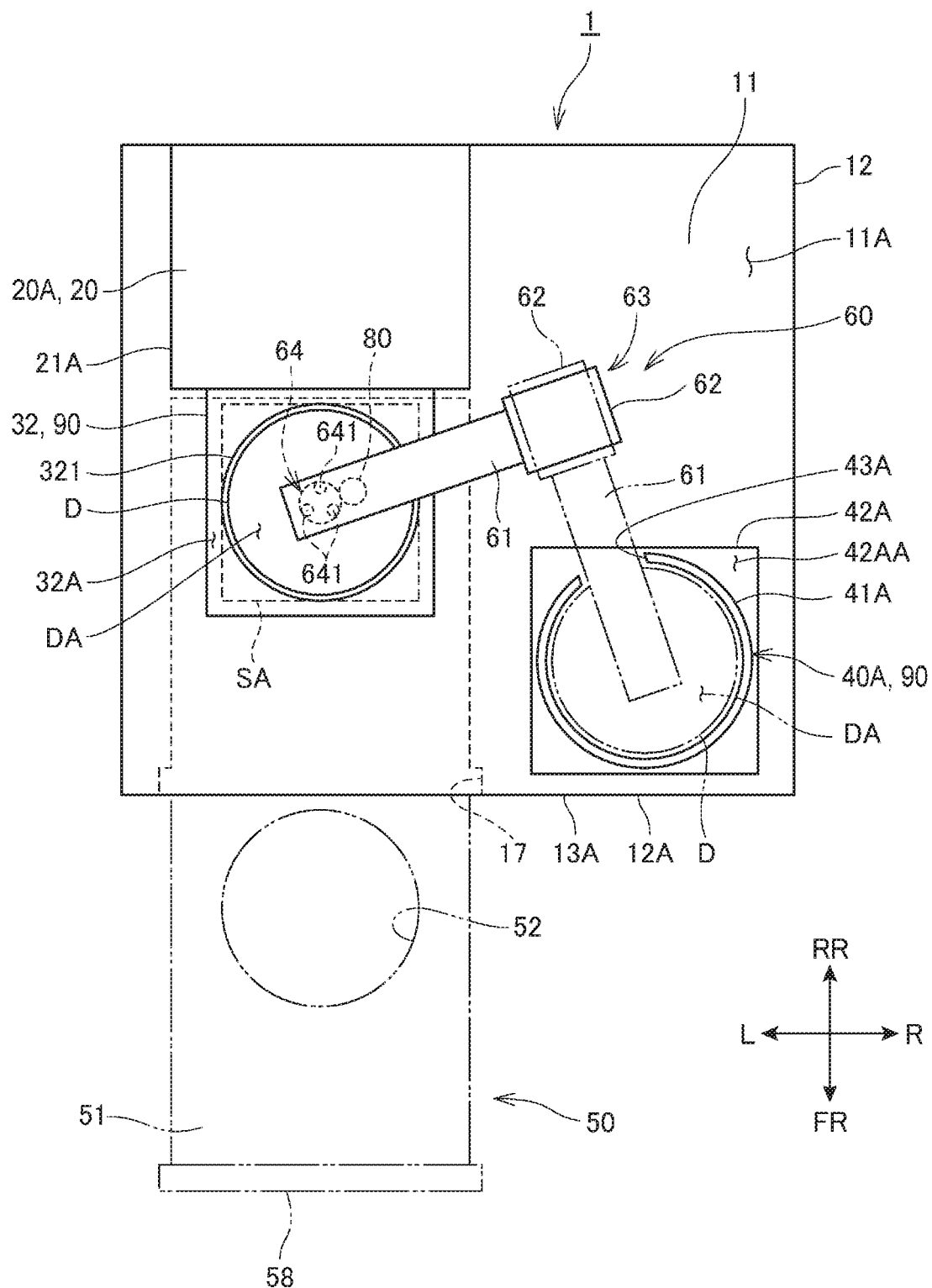
FIG. 8 is a top plan view of the interior of a housing of the publisher.

FIG. 7 is a front view illustrating a configuration of a publisher 1 according to the third embodiment. FIG. 8 is a top plan view of the interior of a housing 10 of the publisher 1 according to the third embodiment. In the following description, the same components as those of the publisher 1 according to the first embodiment will be denoted by the same reference numerals, and a detailed description thereof will be omitted.

As can be appreciated from comparison between FIGS. 1 and 7, and comparison between FIGS. 2 and 8, in the publisher 1 according to the third embodiment, a camera 80 is provided at a lower end portion of a transport arm 61 in a longitudinal direction to photograph an area below the camera 80, the lower end portion being opposite to a lower end portion at which a guide 62 is provided. According to the present embodiment, the camera 80 is provided more adjacent to the guide 62 in the longitudinal direction of the transport arm 61 than a disc-gripping portion 64 provided on the lower end portion of the transport arm 61 is. In the publisher 1, a disc D is transported by the transport arm 61, in a state where a label surface DA faces upward. Therefore, the camera 80 provided in the transport arm 61 faces the label surface DA of the disc D when the disc D is received in a disc receiving portion 90 by the transport arm 61, in a housing 10 of the publisher 1.

Note that, in the publisher 1 illustrated in FIGS. 7 and 8, the camera 80 is focused on a mounting surface 32A of a printer tray 32 positioned in a printer transfer position in a vertical direction. Further, a photographing range SA of the camera 80 is a range within the mounting surface 32A of the printer tray 32 when viewed from above, and is set to include at least the mounted disc D when the transport arm 61 is positioned at a position at which a central axis of three gripping members 641 aligned in the same circle coincides with a central axis of the disc D mounted in the printer tray 32 positioned in the printer transfer position. Note that the focus and the photographing range SA of the camera 80 according to the third embodiment are not limited thereto, and are appropriately adjusted or set in accordance with positions of the disc receiving portion 90, the first stacker 40A, or the second stacker 40B where the photographing is performed, or a position of the transport arm 61 at the time of photographing. In addition, a position of the camera 80 may be changed by vertically moving the transport arm 61, thereby adjusting the focus of the camera 80.

4. Summary of Respective Embodiments

As described above, the publisher 1 according to each embodiment includes a disc receiving portion 90 receiving a disc D configured to record data and a camera 80 provided facing a label surface DA of the disc D received in the disc receiving portion 90.

With such a configuration, since the publisher 1 includes the camera 80 facing the label surface DA of the disc D received in the disc receiving portion 90, the publisher 1 can photograph the label surface DA of the disc D by the photographing with the camera 80.

The publisher 1 according to the first embodiment includes the transport arm 61, which includes the disc-gripping portion 64 gripping the disc D received in the printer tray 32 and transports the disc D, and the label printer 30 performing printing on the label surface DA of the disc D. The label printer 30 includes the printer tray 32 that can move between the drive transfer position where the disc D is mounted by the transport arm 61 and the printing position where the printing on the label surface DA of the disc D is performed. The camera 80 is provided facing the label surface DA of the disc D mounted in the printer tray 32 at the drive transfer position.

With such a configuration, since the camera 80 is provided facing the label surface DA of the disc D mounted in the printer tray 32 at the printer transfer position, it is possible to photograph the label surface of the disc D mounted in the printer tray 32 positioned in the printer transfer position.

Further, the following effects are exerted in addition to the above-described effect. According to the present embodiment, since the publisher 1 includes one label printer 30, it is possible to photograph the label surface DA of the disc D without adjusting the focus of the camera 80 each time the photographing is performed.

Further, the publisher 1 according to the first embodiment includes the transport arm 61, which includes the disc-gripping portion 64 gripping the disc D received in the drive tray 22 and transports the disc D, and the disc drive 20 writing and reading data to and from the disc D. The disc drive 20 includes the drive tray 22 that can move between the disc transfer position where the disc D is mounted by the transport arm 61 and the disc processing position where the reading and writing of data from and to the disc D are performed. The camera 80 is provided facing the label surface DA of the disc D mounted in the drive tray 22 at the disc transfer position.

With such a configuration, since the camera 80 is provided facing the label surface DA of the disc D mounted in the drive tray 22 at the disc transfer position, it is possible to photograph the label surface DA of the disc D mounted in the drive tray 22 positioned in the disc transfer position. Further, the following effects are exerted in addition to the above-described effect. The disc D is mounted in the drive tray 22 at the disc transfer position when the disc drive 20 writes or reads data to and from the disc D. As a result, in the publisher 1, the camera 80 can photograph the label surface DA of the disc D mounted in the drive tray 22 at the time of processing performed by the disc drive 20. Therefore, in the publisher 1, it is not necessary to perform processing only for photographing, such as pulling the printer tray 32 and mounting the disc D for photographing with the camera 80, in the processing of the disc D including the photographing by the camera 80 and the processing with the disc drive 20. Accordingly, in the publisher 1, it is possible to efficiently photograph the label surface DA of the disc D while reducing a time required for the processing of one disc D. Note that when the camera 80 photographs the label surface DA of the disc D mounted in the drive tray 22, the focus or the photographing range SA of the camera 80 is appropriately adjusted in accordance with a position of the drive tray 22 in which the disc D is mounted.

In the publisher 1 according to the second embodiment, the camera 80 is provided facing the label surface DA of the disc D stacked and received in the first stacker 40A.

With such a configuration, since the camera 80 is provided facing the label surface DA of the disc D mounted on the first stacker 40A, it is possible to photograph the label surface DA of the disc D mounted in the first stacker 40A. Further, the following effects are exerted in addition to the above-described effect. In the publisher 1, the camera 80 can photograph the label surface DA of the disc D when the transportation of the disc D from the first stacker 40A starts. Therefore, in the publisher 1, it is not necessary to perform processing related to photographing after starting the transportation of the disc D in the processing of the disc D. Accordingly, in the publisher 1, it is possible to efficiently photograph the label surface DA of the disc D while reducing a time required for the processing of one disc D.

In the publisher 1 according to the third embodiment, the camera 80 is provided in the transport arm 61.

With such a configuration, since the camera 80 is provided in the transport arm 61, it is possible to photograph the label surface DA of the disc D received in the disc receiving portion 90. Further, the following effects are exerted in addition to the above-described effect. Since the camera 80 is provided in the transport arm 61, it is not necessary to perform processing in which the transport arm 61 retreats to the specific position at the time of photographing with the camera 80. Therefore, in the publisher 1, it is possible to photograph the label surface DA of the disc D while preventing the movement of the transport arm 61 from being complicated.

5. Modified Example

Next, a modified example of the respective embodiments will be described.

Figure 9:
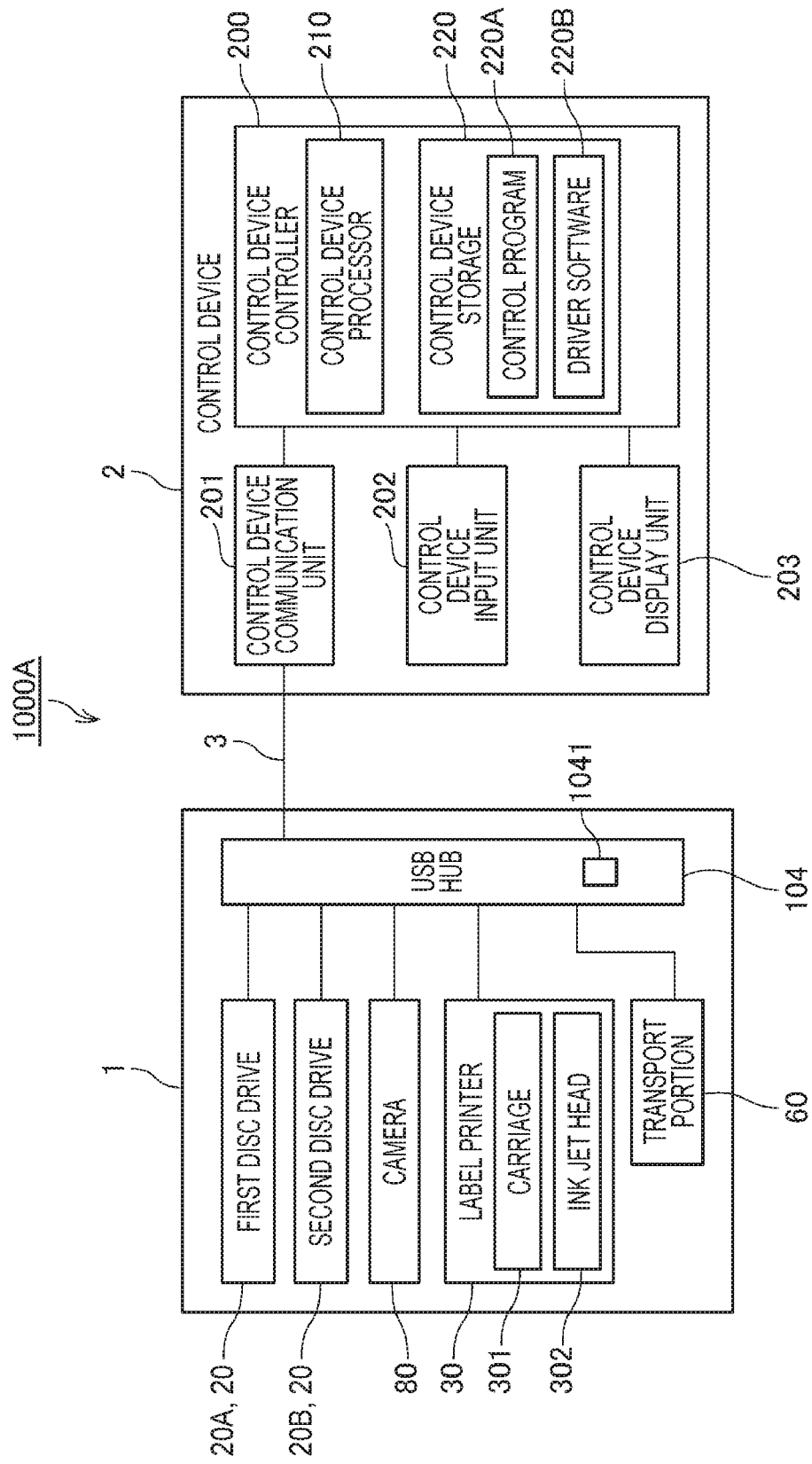
FIG. 9 is a diagram illustrating a configuration of a disc processing system according to a modified example.

FIG. 9 is a diagram illustrating a configuration of a disc processing system 1000A according to a modified example.

When a configuration of each component of a publisher 1 and a control device 2 according to the modified example is the same as that of the respective embodiments, the same reference numeral is used and a detailed description thereof will be omitted.

The publisher 1 according to the modified example includes a USB hub 104.

The USB hub 104 is a communication interface for establishing communication between the first disc drive 20A, the second disc drive 20B, the camera 80, the label printer 30, and the transport portion 60. The USB hub 104 includes a USB hub controller 1041 performing distribution of a command or data to be output to the first disc drive 20A, the second disc drive 20B, the camera 80, the label printer 30, and the transport portion 60. The first disc drive 20A, the second disc drive 20B, the label printer 30, and the transport portion 60 included in the publisher 1 is connected to the control device 2 via the USB hub 104 by using a USB cable 3.

The control device 2 includes a control device controller 200, a control device communication unit 201, a control device input unit 202, and a control device display unit 203.

The control device controller 200 includes a control device processor 210, which is a processor executing a program, such as a CPU or an MPU, and control device storage 220, and controls each component of the control device 2. The control device controller 200 performs various processing with a combination of hardware and software so that the control device processor 210 reads a control program 220A, a driver software 220B, or the like stored in the control device storage 220.

The control device storage 220 has a storage region in which a program to be executed by the control device processor 210 or data to be processed by the control device processor 210 are stored. The control device storage 220 stores the control program 220A to be executed by the control device processor 210, the driver software 220B, or other various data. The driver software 220B is a program for the control device processor 210 to perform an operation of controlling the publisher 1 as described later. The control device storage 220 has a non-volatile storage region in which a program or data are stored in a non-volatile manner. Further, the control device storage 220 may include a volatile storage region to configure a work area in which a program to be executed by the control device processor 210 or data to be processed are temporarily stored.

The control device communication unit 201 is implemented by communication hardware according to a USB communication standard and performs communication with the publisher 1 according to a control of the control device controller 200. Note that the communication standard for the communication between the control device communication unit 201 and the publisher 1 is not limited to the USB communication standard. In this case, a hub corresponding to the communication standard is employed as the USB hub 104 of the publisher 1.

The control device input unit 202 includes an operation switch provided in the control device 2, or an input unit coupled to the control device 2, such as a keyboard or a touch panel, detects an operation of the user operating the control device 2 with respect to the input unit, and outputs an operation result to the control device controller 200. The control device controller 200 performs processing corresponding to the operation with respect to the input unit in accordance with an input from the control device input unit 202.

The control device display unit 203 includes a display panel such as a liquid crystal display panel and displays various information according to a control of the control device controller 200.

In the modified example, the control device 2 performs the following operation. That is, when it is determined that photographing of the disc D starts in accordance with detection in the control device input unit 202 or the like, the control device controller 200 of the control device 2 transmits various commands to the publisher 1 by using a function of the driver software 220B to make the publisher 1 perform the operations in Steps SA1 to SA6 illustrated in FIG. 4.

6. Other Embodiments

The respective embodiments and the modified example described above are only an aspect of the present disclosure, and any modification and application is possible without departing from the scope of the present disclosure.

For example, in the second embodiment, the camera 80 is provided above the first stacker 40A, but the camera 80 may also be provided above the second stacker 40B and below the first stacker 40A. For example, in this case, the camera 80 is provided on the lower surface of the first stacker base 42A. However, in this case, it is necessary that the camera 80 is provided so that the transport arm 61 can be inserted into the gap K.

For example, in the third embodiment, the camera 80 is provided more adjacent to the guide 62 than the disc-gripping portion 64 is, at the lower end portion of the transport arm 61. However, the camera 80 may also be provided at a position surrounded by three gripping members 641 so that the optical axis KJ coincides with the central axis of the three gripping members 641 aligned in the same circle.

For example, in the respective embodiments and the modified example, a serial type printing mechanism is described as an example of the label printer 30. However, the label printer 30 may also be a line type printing mechanism.

For example, functions of the publisher controller 100 and the control device controller 200 may be implemented by a plurality of processors or a semiconductor chip.

Further, the respective components illustrated in FIGS. 3 and 9 are only examples, and there is no particular limitation in a specific installation form. In other words, it is not necessary that hardware corresponding to each component is installed, and it is a matter of course that one processor can execute a program to thereby implement functions of the respective components. Further, some of the functions implemented by software in the embodiments described above may be implemented by hardware, or some of the functions implemented by hardware may be implemented by software. In addition, specific detailed configurations of respective other components of the publisher 1 and the control device 2 can be arbitrarily changed without departing from the gist of the present disclosure.

In addition, for example, steps of the operation illustrated in FIG. 4 are steps divided in accordance with main processing contents to facilitate understanding of the operation of each component of the publisher 1, and the present disclosure is not limited by a manner in which processing is divided or a name. The operation may be divided into more steps in accordance with processing content. Further, the operation may be divided so that one step includes more processing operations. An order of steps may be appropriately changed without departing from the gist of the present disclosure.

What is claimed is:

1. A printing apparatus comprising:
a data recording device configured to read and write data from and to a disc and configured to include a first tray moving between a first position where the disc is mounted on a surface of the first tray and a second position where reading and writing of data from and to the disc are performed;
a printer configured to perform printing on a label surface of the disc and configured to include a second tray moving between a third position where the disc is mounted a surface of the second tray and a fourth position where printing is performed on the label surface of the disc, wherein a central axis of the disc mounted in the first tray positioned in the first position and a central axis of the disc mounted in the second tray positioned in the third position substantially coincide with one another;
a camera provided to oppose to the label surface of the disc mounted in the second tray positioned in the third position and configured to photograph the label surface of the disc; and
a housing configured to house the data recording device, the printer and the camera, and the housing configured to include an interior surface on which the camera is fixed, wherein
the camera faces down toward the label surface of the disc mounted in the second tray positioned in the third position, and the camera focuses on the disc mounted in the second tray positioned in the third position, and a photographing range of the camera is a range within the surface of the second tray positioned in the third position,
the camera faces down toward the label surface of the disc mounted in the first tray positioned in the first position, but the camera does not focus on the disc mounted in the first tray positioned in the first position,
the printer performs printing on the label surface of the disc after the data recording device read and wrote data from and to the disc, and
the camera starts to photograph the label surface of the disc after the printer performed printing on the label surface of the disc.

2. The printing apparatus according to claim 1, further comprising:
a transport arm configured to include a disc gripper gripping the disc received in the disc receiver, and configured to transport the disc.

3. The printing apparatus according to claim 1, further comprising a stacker configured to receive discs before processing or discs after processing in a stacked state.

4. The printing apparatus according to claim 1,
the camera does not photograph the label surface of the disc before the printer performs printing on the label surface of the disc.

\* \* \* \* \*